United States Patent [19]
Wada

[11] Patent Number: 5,029,025
[45] Date of Patent: Jul. 2, 1991

[54] MAGNETIC TAPE RECORDING AND PLAYBACK APPARATUS

[75] Inventor: Hajime Wada, Tottori, Japan

[73] Assignees: Sanyo Electric Co., Ltd., Osaka; Tottori Sanyo Electric Co., Ltd., Tottori, both of Japan

[21] Appl. No.: 362,713

[22] Filed: Jun. 7, 1989

[30] Foreign Application Priority Data

Jun. 9, 1988 [JP] Japan .................. 63-142440
Feb. 1, 1989 [JP] Japan ..................... 1-23104
Apr. 25, 1989 [JP] Japan ................... 1-105254

[51] Int. Cl.$^5$ ................. G11B 15/66; G11B 15/02
[52] U.S. Cl. ........................ 360/96.1; 360/96.2; 360/96.5; 360/96.3
[58] Field of Search ............. 360/75, 78.02, 96.01, 360/90, 91, 93, 96.5, 105, 96.02, 75–105

[56] References Cited

U.S. PATENT DOCUMENTS

| | | | |
|---|---|---|---|
| Re. 32,007 | 10/1985 | Nakamichi et al. | 360/69 |
| 4,528,606 | 7/1985 | Tsuchiya | 360/96.3 |
| 4,674,001 | 6/1987 | Takahashi et al. | 360/137 X |
| 4,739,424 | 4/1988 | Yamada et al. | 360/96.5 |
| 4,757,405 | 7/1988 | Laudus | 360/105 |
| 4,799,116 | 1/1989 | Ida et al. | 360/96.2 |
| 4,922,357 | 5/1990 | Komatsu et al. | 360/105 X |
| 4,935,831 | 6/1990 | Shimbo | 360/105 X |

FOREIGN PATENT DOCUMENTS

57-141046 9/1982 Japan ...................... 360/105
59-42659 3/1984 Japan.

Primary Examiner—Robert S. Tupper
Assistant Examiner—Alfonso Garcia
Attorney, Agent, or Firm—Armstrong, Nikaido, Marmelstein, Kubovcik & Murray

[57] ABSTRACT

A magnetic tape recording and playback apparatus includes a tape driving system for driving a tape, a recording/playing system for recording/playing/erasing and a linking device for mechanically linking the operations of the tape driving system with the recording/playing system. The tape driving system includes a motor, a gear train coupled to the motor and a reel shaft for rotating reels of the cassette. The gear train includes an planetary gear which swings. The planetary gear selectively rotates the reel shaft in correspondence with respective operation modes of the magnetic recording and playback apparatus. The linking device includes a cam coupled to the planetary gear and a head base mounting a recording/playing head. The cam transmits the driving power from the motor to the head base through the planetary gear. The head base moves corresponding to the shape of the cam and in association with the operation of the planetary gear. Operation such as recording and playing is carried out on the tape by the movement of the head base.

11 Claims, 19 Drawing Sheets

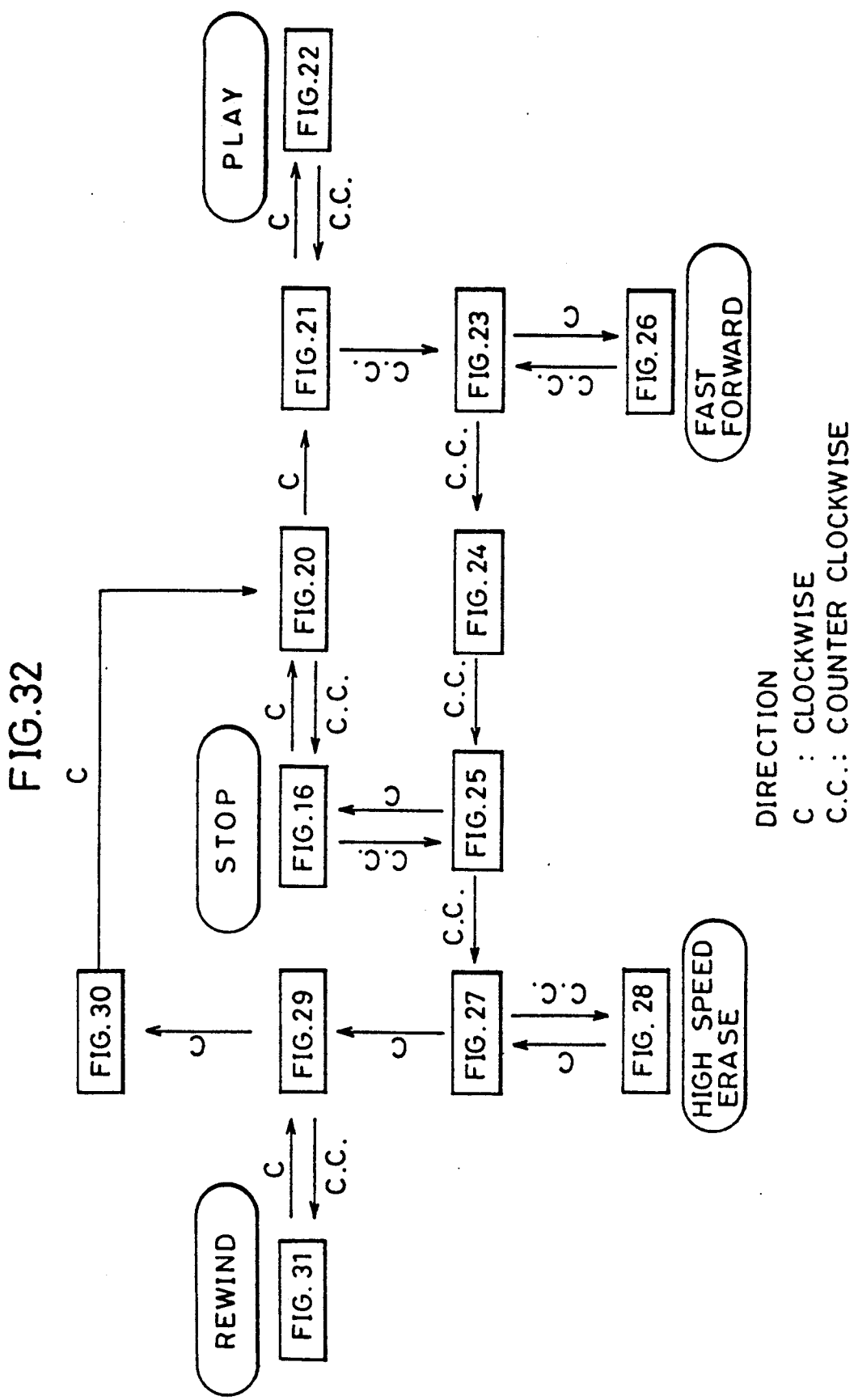

MAGNETIC TAPE RECORDING AND PLAYBACK APPARATUS

BACKGROUND OF THE INVENTION

1. Field of the Invention

The present invention relates to a magnetic tape recording and playback apparatus in which modes of running the tape are switched in accordance with electric signal.

2. Description of the Background Art

Generally, a magnetic tape recording and playback apparatus comprises a tape driving system for running a cassette tape inserted thereto and a recording/playback system for recording/playing magnetic signals on the tape.

The tape driving system comprises, as basic elements, a motor serving as a power source, a pair of reel shafts engaging reels of the cassette tape and transmitting means for transmitting the rotation of the motor to the reel shafts.

The recording/playing system comprises a recording/playing head for recording magnetic signals on the tape or for reading magnetic signals recorded on the tape, and an erasing head for erasing the magnetic signals.

The basic operation modes of the magnetic tape recording and playback apparatus are a stopping mode, recording/playing mode, fast forwarding mode and rewinding mode. Various operation of the tape driving system and of the recording/playing system are combined to carry out prescribed operations in the respective operation modes. For example, in the recording/playing mode, the tape driving system rotates the motor so that a take-up reel of the cassette tape is rotated in a direction of taking up. At the same time, the recording/playing system moves forward a recording/playing head so that the recording/playing head is brought into contact with the surface of a tape running. The recording/playing head records or reads magnetic signals to and from the tape.

In the rewinding mode, the tape driving system rotates the motor to rotate a supply reel of the cassette tape. At the same time, the recording/playing system moves rearward the recording/playing head s that the recording/playing head is spaced away from the surface of the tape.

In this manner, various operation modes can be realized by controlling the operation of the tape driving system and the recording/playing system of the magnetic tape recording and playback apparatus. An example of a mechanism of the tape driving system is shown in U.S. Pat. No. 4,528,606. The tape driving mechanism shown in this example comprises a pair of rollers for transmitting rotation provided between a capstan shaft and a pair of reel shafts. The pair of rollers are rotatively attached to a rocking bracket. The rocking bracket is rotatively attached to the capstan shaft. A belt is wound around the pair of rollers and a pulley provided on the capstan shaft. The rotation of the motor is transmitted to the capstan shaft. The rocking bracket swings in a prescribed direction corresponding to the direction of rotation of the capstan shaft. By the swinging movement of the rocking bracket, either one of the pair of rollers is coupled to one of the reel shafts, so that the rotation is transmitted thereto.

An example of a mechanism of the recording/playing system is disclosed in U.S. Pat. No. Re. 32,007. The recording/playing head and the erasing head are mounted on a head base. The head base is movably attached on a chassis. The head base moves forward/rearward toward the surface of the inserted cassette tape. The head base is connected to a cam by means of a controlling lever. The cam is operated by a controlling motor. The controlling motor rotates in accordance with respective operation modes of the magnetic tape recording and playback apparatus. The cam moves forward/rearward the head base through the controlling lever corresponding to the operation of the controlling motor.

The mechanism of the tape driving system and the recording/playing system of a magnetic tape recording and playback apparatus is also shown in Japanese Patent Laying-Open Number 42659/1984. The tape driving system comprises a capstan shaft, a driving gear attached to the capstan shaft, a pair of planetary gears engaging with the driving gear and a rotary plate rotatably attached to the capstan shaft for rotatably supporting the planetary gear. The rotation of the motor is transmitted to the capstan shaft. The rotation of the capstan shaft swings the rotary plate in a prescribed direction. Consequently, one of the planetary gears engages with one of the reel shaft gears. The rotation of the motor is transmitted to the reel shaft gear through the capstan shaft, the driving gear and the planetary gear.

The recording/playing system comprises a head base on which the recording/playing head and the erasing head are mounted. The head base is movably attached on the chassis. The head base has its one end coupled to a turning lever connected to a plunger of a solenoid. The operation of the plunger of the solenoid moves forward/rearward the head base through the turning lever. That operation of the tape driving system and the movement of the head base are related with each other by means of an electric controlling system.

As described above, in the conventional magnetic tape recording and playback apparatuses, the mechanism of the tape driving system and that of the recording/playing system are independent from each other, and generally the prescribed operation modes are set by electric controlling means. Such structure is against the current trend of reducing the size of the magnetic recording and playback apparatuses, as it is large and the control system is complicated.

SUMMARY OF THE INVENTION

An object of the present invention is to miniaturize structure of a magnetic recording and playback apparatus.

Another object of the present invention is to simplify linked operations of a tape driving system and a recording/playing system of a magnetic recording and playback apparatus.

A further object of the present invention is to simplify electric control of respective operation modes of a magnetic tape recording and playback apparatus.

A still further object of the present invention is to enable mechanical linked operations of a tape driving system and a recording/playing system of a magnetic tape recording and playback apparatus.

A magnetic recording and playback apparatus of the present invention comprises a tape driving system, a recording/playing system and linking apparatus. The tape driving system comprises a pair of reel spindles engaging with reels of a cassette tape, a driving source for generating driving power, and transmitting apparatus for selectively transmitting driving power to the pair of reel spindles corresponding to the respective operation modes of the magnetic tape recording and playback apparatus. The recording/playing system comprises a magnetic head and a magnetic supporting member. The linking apparatus is mechanically and movably coupled to the head supporting member and the transmitting apparatus.

In the recording/playing mode, the driving power generated in the driving source drives one of the pair of reel spindles through the transmitting apparatus. At the same time, the head supporting member is moved forward to a position enabling recording/playing of the tape through the linking apparatus. In the fast forwarding and rewinding modes, the driving power generated in the driving source drive prescribed reel spindles. At the same time, the driving power moves rearward the head support member from the tape through the linking apparatus means.

In one embodiment of the present invention, the driving source is a motor which can be rotated in the forward and reverse direction, the transmitting apparatus is a gear train coupled to the motor, and the linking apparatus comprises a cam coupled to the gear train and the head support member.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 32 is a block diagram showing the respective operation modes.

DETAILED DESCRIPTION OF THE PREFERRED EMBODIMENTS

Figure 1:
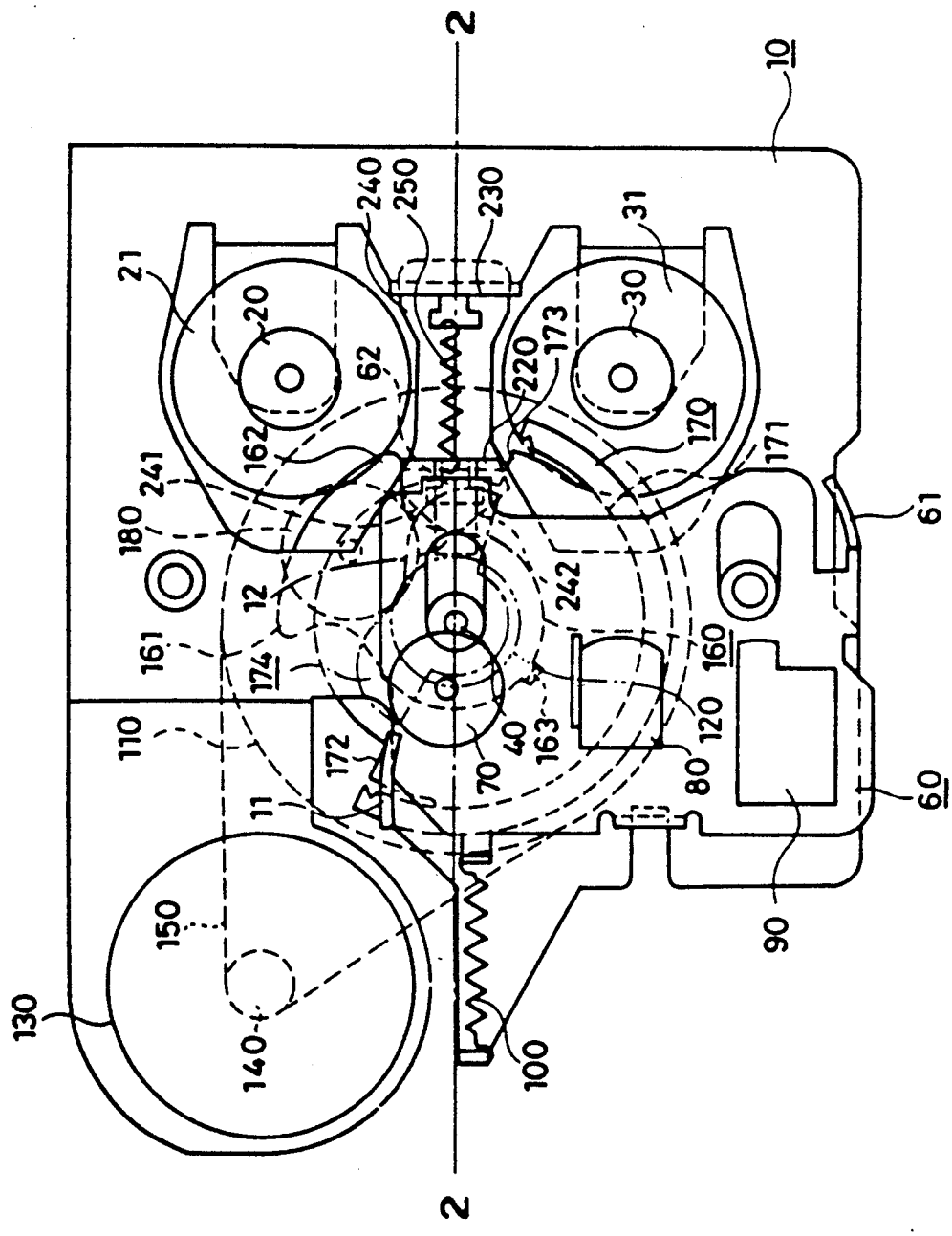
FIG. 1 is a plan view of a magnetic tape recording and playback apparatus in accordance with a first embodiment of the present invention.

Structure of a magnetic tape recording and playback apparatus in accordance with a first embodiment of the present invention will be hereinafter described with reference to FIGS. 1 and 2. Reel shafts 20 and 30 are attached to a main plate 10. Reel shaft gears 21 and 31 are in pressure contact with and coaxially attached to the reel shafts 20 and 30 with frictional members formed of felt or the like interposed therebetween. A capstan shaft 40 is rotatably attached to a bearing member 50 fixed on the main plate 10. A pinch roller 70, a playing magnetic head 80 and an erasing magnetic head 90 are mounted on a head base 60. The pinch roller 70 can be engaged with and released from the capstan shaft 40 as the head base 60 moves. The head base 60 can be slid about the main plate 10 by means of slide guides 61 and 11. One slide guide 61 is formed by bending a portion of the head base 60. The other slide guide 11 is formed by bending a portion of the main plate 10. The head base 60 slides in the left and right directions as viewed in FIG. 1. A through hole 12 whose length corresponding to the distance of sliding of the head base 60 is formed in the main plate 10. The head base 60 has a guiding portion 62. The guiding portion 62 is inserted into the through hole 12 to guide the movement of the head base 60. A spring 100 is provided between the head base 60 and the main plate 10. The head base 60 is biased by the spring 100 so that the pinch roller 70 is moved away from the capstan shaft 40. A flywheel 110 is attached to a lower portion of the capstan shaft 40. A driving gear 120 is fixed on a surface of the flywheel 110 coaxially with the capstan shaft 40.

A motor 130 is fixed on the main plate 10. A motor pulley 140 is fixed on the rotary axis of the motor 130. The motor pulley 140 and the flywheel 110 are coupled by means of an endless belt 150.

The bearing member 50 has a step portion 51. A rotary plate 160 is rotatably attached at an upper portion of the step portion 51 of the bearing portion 50. Contact portions 161 and 162 projecting in the peripheral direction are formed on one end of the rotary plate 160. An engaging projection 163 is formed on the other end. The engaging projection 163 is formed by bending downward the other end of the rotary plate 160 (see FIG. 4). An internal gear 170 is rotatably fixed on the bearing portion 50 positioned between the main plate 10 and the rotary plate 160.

Figure 3:
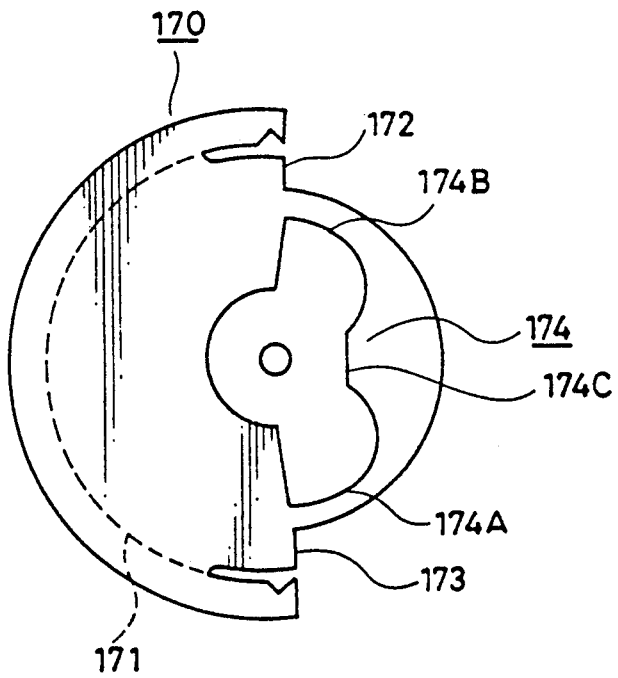
FIG. 3 is a plan view of an internal gear shown in FIG. 1.

Referring to FIG. 3, the internal gear 170 comprises an inner teeth portion 171 and a cam 174. The inner teeth portion 171 is formed on the lower surface of a semicircular disc. The cam 174 is formed on the upper surface on the opposite side of the inner teeth portion 171. Steps 172 and 173 are formed on opposing ends of the inner teeth portion 171. The cam 174 comprises a portion 174A having large diameter, a portion 174B having smaller diameter and a concave portion 174C. The internal gear 170 is attached such that the guiding portion 62 of the head base 60 is in contact with the cam 174 through the through hole of the main plate 10. The cam 174 moves, the head base 60 in a prescribed direction against exerted by the force of the spring 100, corresponding to the rotation of the internal gear 170.

Figure 4:
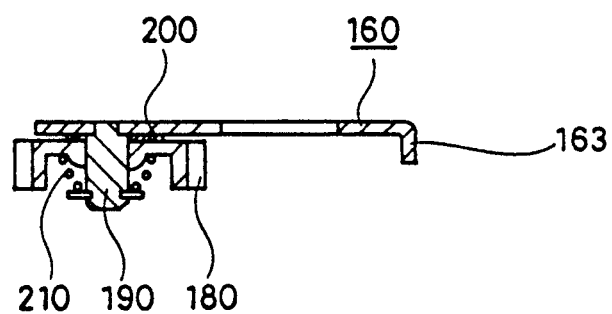
FIG. 4 is a cross sectional view of an assembly of a rotary plate and an planetary gear shown in FIG. 1.

Referring to FIG. 4, a planetary gear 180 is rotatably attached through a washer 200 to an axis or hub member 190 which is fixed on one end of the rotary plate 160. The planetary gear 180 is in pressure contact with the rotary plate 160 by a spring 210. The planetary gear 180 is always engaged with the driving gear 120, and as it is brought into pressure contact with the rotary plate 160, it is rotated in the same direction as the driving gear 120 rotates. At a certain point of rotation, the planetary gear 180 engages with the inner teeth portion of the internal gear 170. Since the planetary gear 180 is in pressure contact with the rotary plate 160 by means of the spring 210, the rotation in the same direction is applied as the driving gear 120 is rotated.

The main plate 10 comprises first and second support plates 220 and 230 formed by bending downward portions of the plate 10. The first support 220 is provided to stop the rotation of the rotary plate 160 and of the internal gear 170 over a prescribed position, to which the contact portions 161 and 162 of the rotary plate 160 and the step portions 172 and 173 of the internal gear 170 abut. A stopper plate 240 is movably provided between the first and second support plates 220 and 230. Taper portions 241 and 242 are formed on the tip end of the stopper plate 240. An engaging projection 163 of the rotary plate 160 abuts the taper portions 241 and 242 so as to temporarily stop the rotation of the rotary plate 160. The stopper plate 240 is biased to the side of the capstan shaft 40 by means of a spring 250 provided between the first support 220 and the stopper plate 240.

Figure 5:
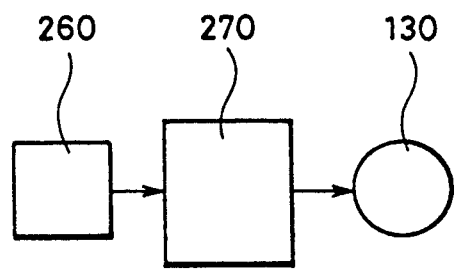
FIG. 5 is a block diagram showing control of a motor.

Referring to the block diagram of FIG. 5, an instructing circuit 260 outputs instructions of the respective modes of stopping, playing, fast forwarding, rewinding and high speed erasing. A control circuit 270 controls direction and speed of rotation of the motor 130 at a prescribed timing in switching between respective modes.

The operation of the magnetic tape recording and playback apparatus in accordance with the first embodiment will be described based on FIG. 15 and referring to FIGS. 6 to 14.

Figure 2:
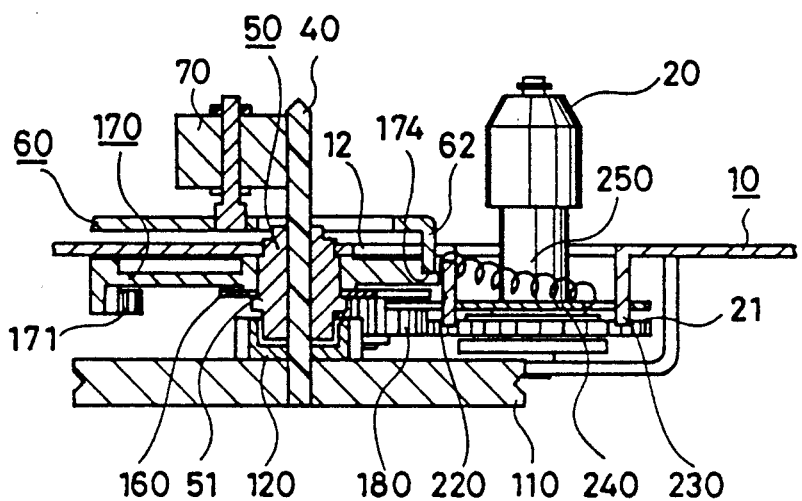
FIG. 2 is a cross sectional view taken along the line A—A' of FIG. 1.
Figure 6:
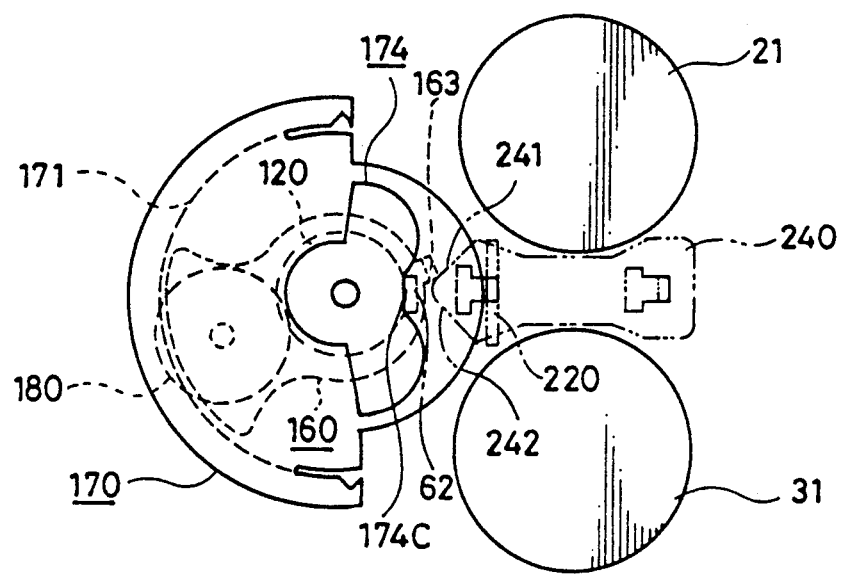
FIGS. 6 to 14 illustrate operations of the magnetic tape recording and playback apparatus corresponding to respective operation modes.
Figure 15:
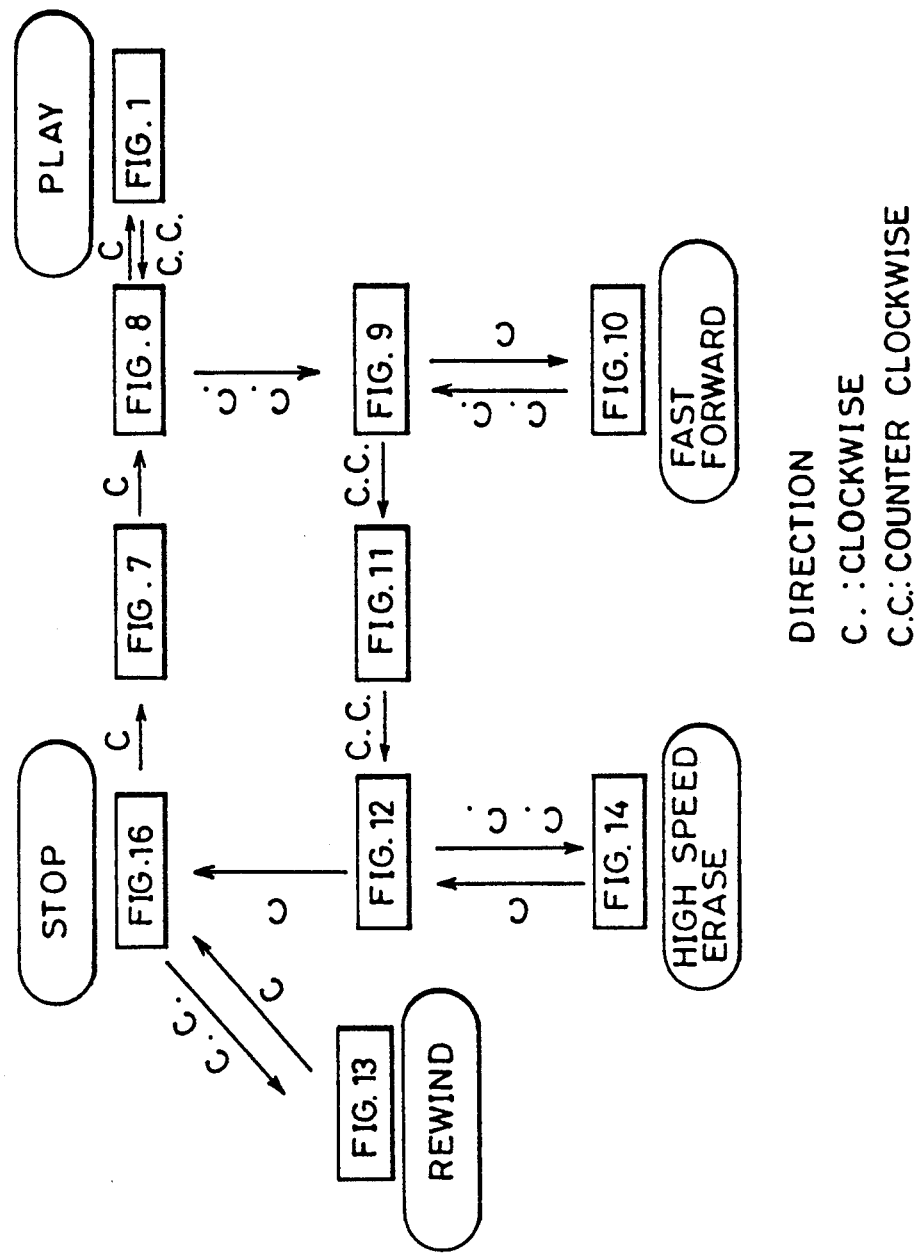
FIG. 15 is a block diagram showing respective operation modes.

Referring to FIG. 15, the terms "clockwise" and "counterclockwise" represent directions of rotation of the motor 130 in FIG. 1. Switching from the stopping mode to the playing mode will be described at first. The stopping mode corresponds to the following states, as shown in FIG. 6.

(1) The guiding portion 62 of the head base 60 is positioned in the concave portion 174C of the cam 174 of the internal gear 170 by the force of the spring 100.

(2) The head base 60 is positioned at the left most position, the pinch roller 70 is completely separated from the capstan shaft 40, and the respective magnetic heads 80 and 90 are completely separated from the tape.

(3) The engaging projection 163 of the rotary plate 160 is in contact with one taper portion 241 of the stopper plate 240.

Figure 7:
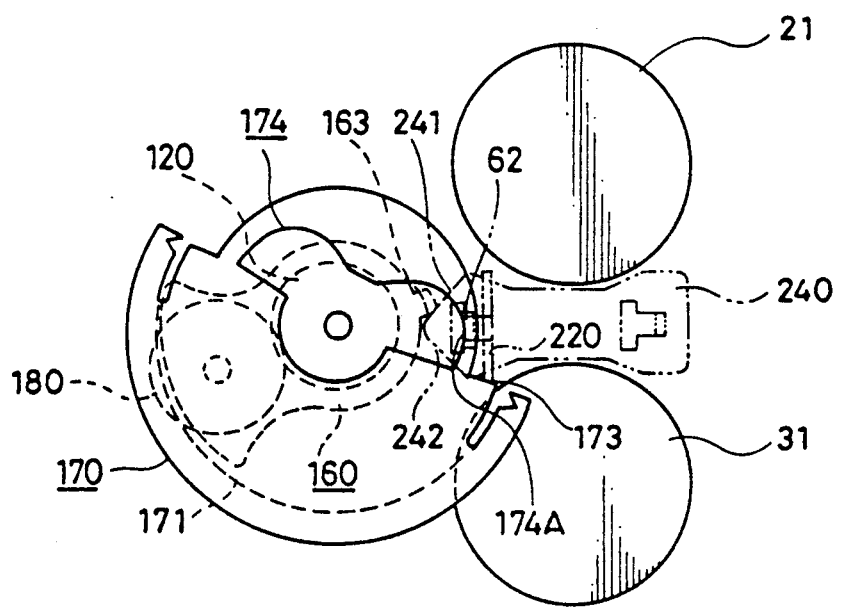

When a play instruction signal is applied from the instructing circuit 260 to the controlling circuit 270 in the state of FIG. 6, the controlling circuit 270 rotates the motor 130 in the clockwise direction. Consequently, the flywheel 110 and the driving gear 170 are also rotated in the clockwise direction. Although the rotary plate 160 tends to rotate in the clockwise direction as the driving gear 120 rotates in the clockwise direction, the rotary plate is stopped as the engaging projection 163 abuts the stopper plate 240. In this state, the rotation of the driving gear 120 is transmitted to the internal teeth portion 171 of the internal gear 170 through the planetary gear 180, so that the internal gear 170 rotates in the counterclockwise direction. This is because the power stopping the rotation of the rotary plate 160 applied from the spring 250 transmitted through the stopper plate 240 is set larger than the power stopping the rotation of the internal gear 170a applied from the spring 100 transmitted through the guiding portion 62. Referring to FIG. 7, when the internal gear 170 is rotated and the step portion 173 comes to be in contact with the support plate 220, then the portion 174A having large diameter of the cam 174 of the internal gear 170 moves the guiding portion 62 of the head base 60 to the right most portion. Consequently, the pinch roller 70 and the capstan shaft 40 sandwiches the tape. The playing magnetic head 80 is brought into contact with the tape. The power applied from the spring 100 to the guiding portion 62 works on the contact surface of the cam 174 to which the guiding portion 62 is brought into contact. Therefore, the shape of the portion 174A having large diameter of the cam 174 is determined such that the power rotates the internal gear 170 counterclockwise. Therefore, the stopped state of the internal gear 170 can be maintained stable.

Figure 8:
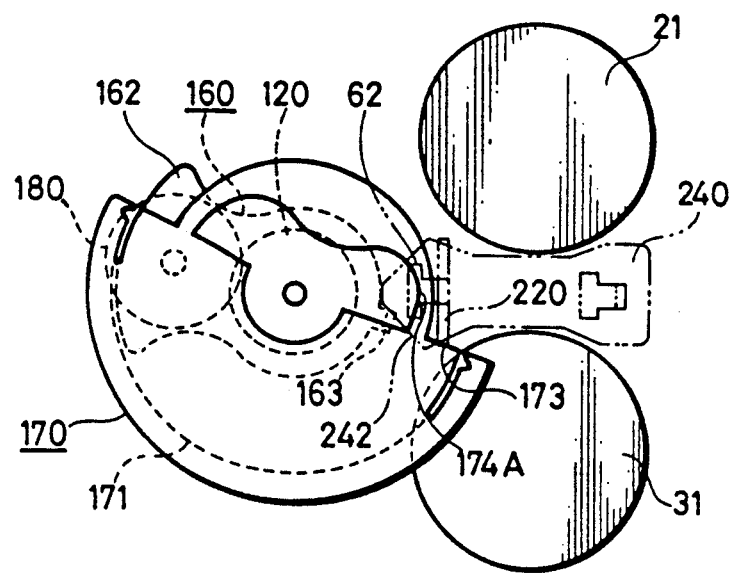

Referring to FIG. 8, the further rotation of the internal gear 170 is stopped when the above described state is realized. Consequently, the rotary plate 160 rotates in the clockwise direction, with the engaging projection 163 moving the stopper plate 240 to the right against the force of the spring 250. The rotary plate 160 is further rotated until the contact portion 162 is brought into contact with the support plate 220. Referring to FIG. 1, the planetary gear 180 comes to be engaged with one reel shaft gear 21 by the rotation of the rotary plate 160. In the state of FIG. 1, the rotation of the motor 130 is transmitted to the reel shaft gear 21 through the flywheel 110, the driving gear 120 and the planetary gear 180. The apparatus is in the playing mode in which the magnetic signal on the tape is read by the playing head 80.

Figure 12:
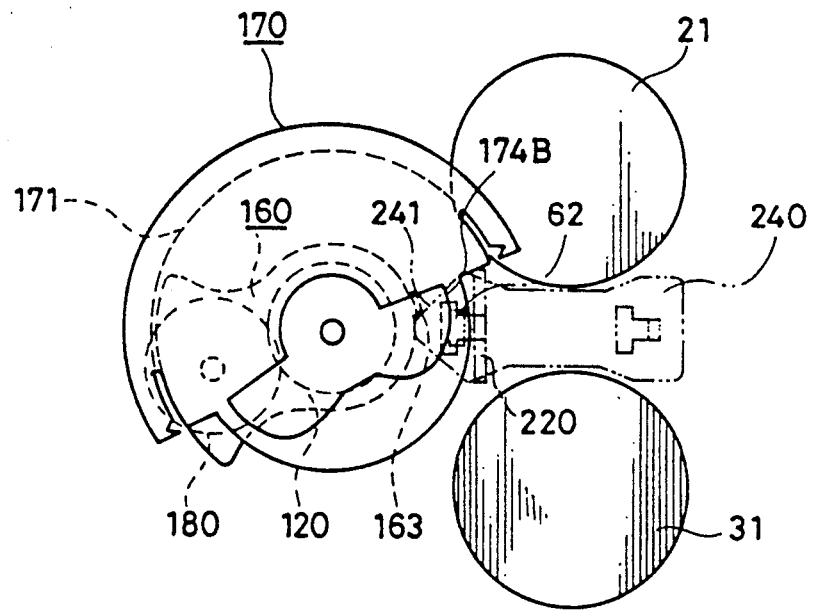

The switching from the playing mode to the stopping mode will be described in the following. When a stop instruction signal is applied from the instructing circuit 260 to the controlling circuit 270 in the state of FIG. 1, the controlling circuit 270 rotates the motor 130 in the counterclockwise direction. Consequently, the rotary plate 160 is rotated in the counterclockwise direction until the engaging projection 160 abuts the taper portion 242 of the stopper plate 240, as shown in FIG. 8. At the time when the engaging projection 163 is brought into contact with the taper portion 242, the planetary gear 180 has been engaged with the inner teeth portion 171 of the internal gear 170. Therefore, the rotation of the driving gear 120 is transmitted to the internal teeth portion 171 of the internal gear through the planetary gear 180, and the internal gear 170 rotates in the clockwise direction. The internal gear 170 is further rotated through the state of FIG. 9 to the state of FIG. 11. When the step portion 172 of the internal gear 170 abuts the support plate 220, the rotary plate 160 rotates in the counterclockwise direction, as the engaging projection 163 moves the stopper plate 240 in the right against the force of the spring 250, as in the case of FIGS. 7 and 8. When the engaging projection 163 of the rotary plate 160 abuts the taper portion 241 of the stopper plate 240 as shown in FIG. 12, the controlling circuit 270 rotates the motor 130 in the clockwise direction. Since the rotary plate 160 does not rotate in this state, the rotation of the driving gear 120 is transmitted to the inner teeth portion 172 of the internal gear 170 through the planetary gear 180. Consequently, the internal gear 170 rotates in the counterclockwise direction. When the internal gear 170 is further rotated to the state of FIG. 6, the control circuit 270 stops the rotation of the motor 130, and the apparatus is in the stopping mode.

The switching from the stopping mode t the fast forwarding mode will be described in the following. When a fast forwarding instruction signal is applied from the instructing circuit 260 to the controlling circuit 270 in the state of FIG. 6, the controlling circuit 270 rotates the motor 130, so that it is moved through the state of FIG. 7 to the state of FIG. 8. When the state of FIG. 8 is realized, the controlling circuit 270 rotates the motor 130 in the counterclockwise direction. Since the rotary plate 160 does not rotate in this state, the rotation of the driving gear 120 is transmitted to the internal teeth portion 171 of the internal gear 170 through the planetary gear 180 and the internal gear 170 rotates in the clockwise direction. When the internal gear 170 is further rotated to the state of FIG. 9, the pinch roller 70 is completely separated from the capstan shaft 40 and the respective magnetic heads 80 and 90 are completely separated from the tape, as in the case of FIG. 6. Thereafter, the controlling circuit 270 rotates the motor 130 in the clockwise direction. Consequently, a force is applied to the rotary plate 160 to rotate the same in a direction in which the engagement between the engaging projection 163 thereof and the taper 242 of the stopper plate 240 is released, whereby the rotary plate 160 rotates in the clockwise direction. Although a force to rotate the internal gear 170 in the counterclockwise direction is applied from the planetary gear 180 when the rotary plate 160 is rotated in the clockwise direction, the force to stop the internal gear 170 applied by the guiding portion 62 to the cam 174 is larger, and therefore the internal gear 170 is kept stopped.

Figure 10:
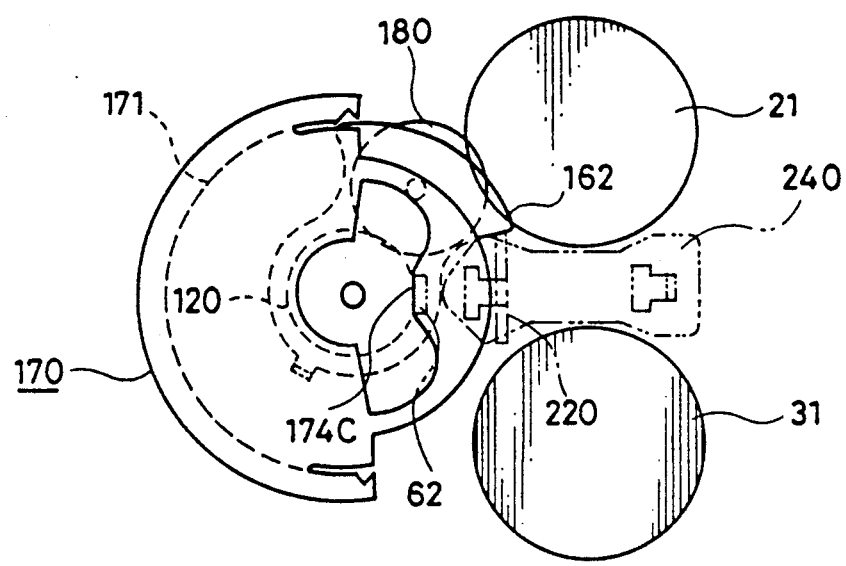
Figure 11:
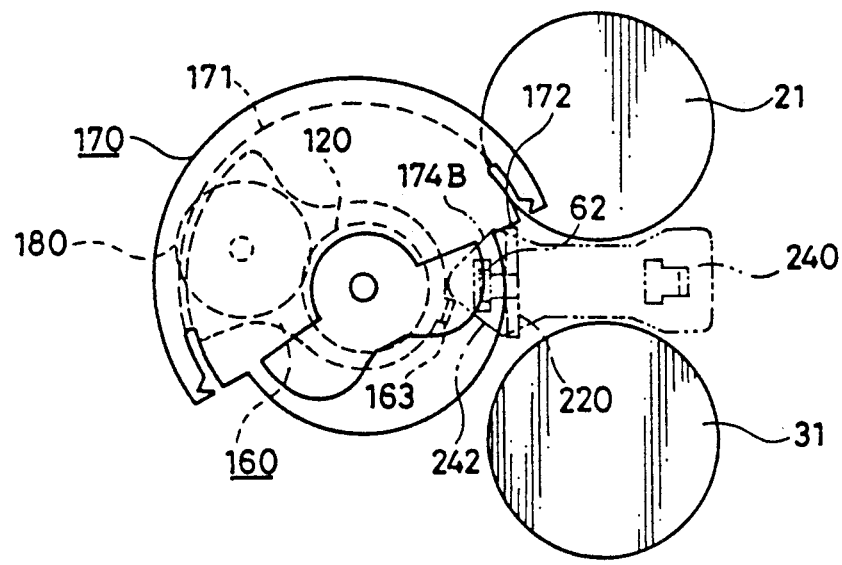

Consequently, as shown in FIG. 10, the rotary plate 160 is rotated until the contact portion 162 abuts the support plate 220. When the planetary gear 180 engages with the reel shaft gear 21, the apparatus enters the fast forwarding mode. On this occasion, the control circuit 270 increases the speed of rotation of the motor 130.

Figure 9:
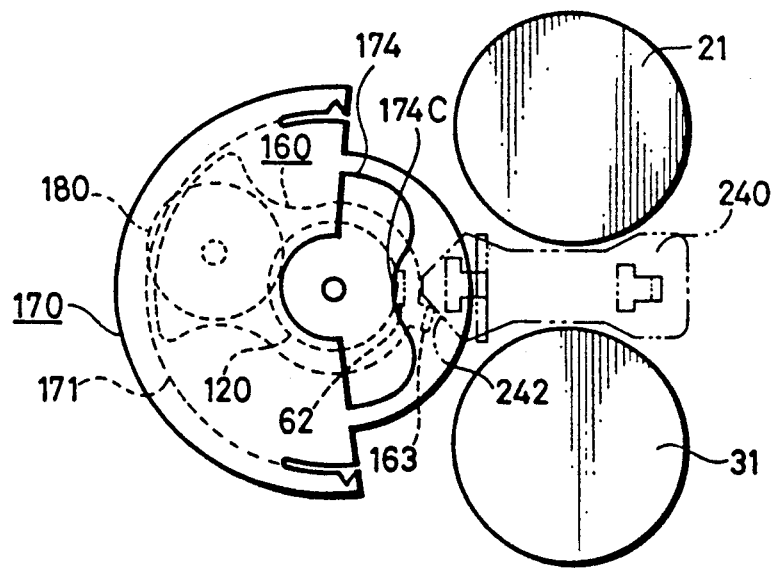

The switching from the fast forwarding mode to the stopping mode will be described. When a stopping instruction signal is applied from the instructing circuit 260 to the controlling circuit 270, the controlling circuit 270 rotates the motor 130 in the counterclockwise direction. Consequently, the rotary plate 160 rotates in the counterclockwise direction until the engaging projection 163 abuts the taper portion 242 of the stopper plate 240, as shown in FIG. 9. When the engaging projection 163 abuts the taper portion 242, the planetary gear 180 has been engaged with the internal teeth portion 171 of the internal gear 170. Therefore, the rotation of the driving gear 120 is transmitted to internal teeth portion 171 of the internal gear 170 through the planetary gear 180, and the internal gear 170 rotates in the clockwise direction. Consequently, the state of the apparatus is changed through that of FIG. 11 to that of FIG. 12 as in the switching from the playing mode to the stopping mode. When this state is realized, the control circuit 270 rotates the motor 130 in the clockwise direction, so that the apparatus is brought to the state of FIG. 16, realizing the stopping mode.

Figure 13:
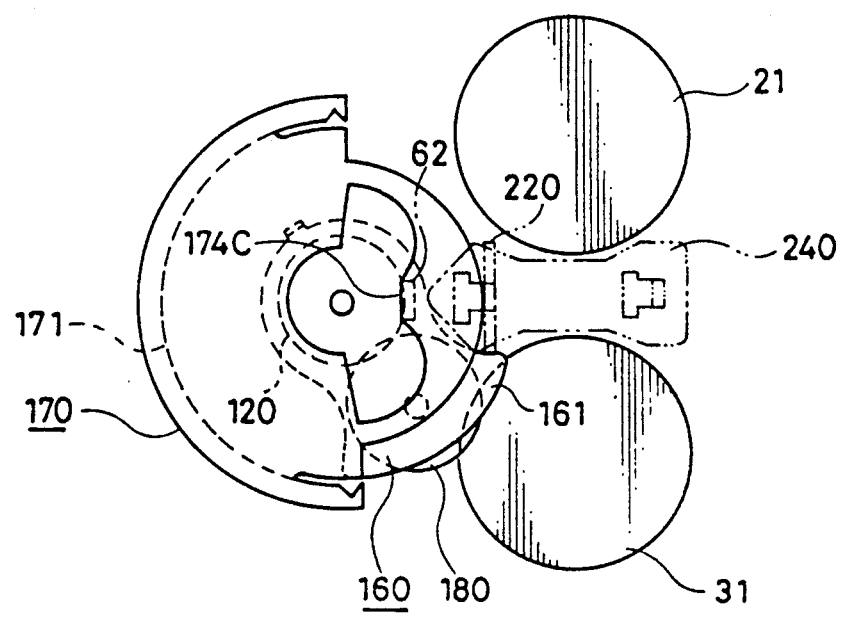

Switching from the stopping mode to the rewinding mode will be described in the following. When a rewinding instruction signal is applied from the instructing circuit 260 to the controlling circuit 270 in the state of FIG. 6, the controlling circuit 270 rotates the motor 130 in the counterclockwise direction. On this occasion, a force is applied to the rotary plate 160 in a direction to release engagement between the engaging projection 163 thereof with the taper portion 241 of the stopper plate 240, whereby the rotary plate 160 rotates in the counterclockwise direction. In this state, the internal gear 170 is kept stopped as described with reference to the switching from the stopping mode to the fast forwarding mode, so that the pinch roller 70 is separated from the capstan shaft 40 and the respective magnetic heads 80 and 90 are separated from the tape. Therefore, the rotary plate 160 rotates until the contact portion 161 abuts the support plate 220, as shown in FIG. 13. When the planetary gear 180 engages with the reel shaft gear 31, the apparatus enters the rewinding mode. In this rewinding mode also, when the planetary gear 180 engages with the reel shaft gear 31, the control circuit 270 increases the speed of rotation of the motor 130, as in the case of the fast forwarding mode.

The switching from the rewinding mode to the stopping mode will be described. When a stopping instruction signal is applied from the instructing circuit 260 to the controlling circuit 270 in the state of FIG. 13, the controlling circuit 270 rotates the motor 130 in the clockwise direction. Consequently, the rotary plate 160 rotates in the clockwise direction. When the engaging projection 163 abuts the taper portion 241 of the stopper plate 240, as shown in FIG. 6, the controlling circuit 270 stops rotation of the motor 130, and the apparatus is in the stopping mode.

Figure 14:
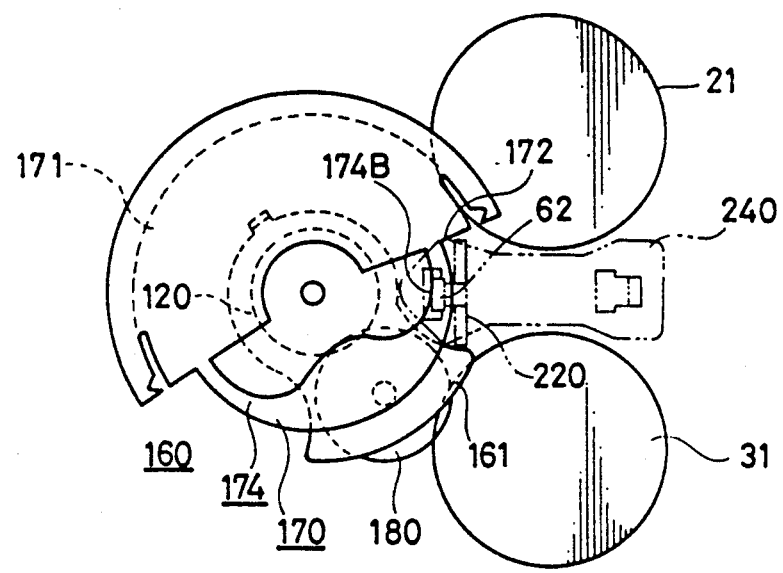

The switching from the stopping mode to the high speed erasing mode will be described. When a high speed erasing instruction signal is applied from the instructing circuit 260 to the controlling circuit 270 in the state of FIG. 6, the controlling circuit 270 rotates the motor 130 in the clockwise direction, and the state of the apparatus is changed from that of FIG. 6 to the state of FIG. 8 through the state of FIG. 7, as in the case of switching from the stopping mode to the playing mode described above. When the state of FIG. 8 is realized, the controlling circuit 270 rotates the motor 130 in the counterclockwise direction, and the state of the apparatus is changed from that of FIG. 9 to that of FIG. 12 through the state of FIG. 11, as in the case of switching from the playing mode to the stopping mode. In the state of FIG. 12, the controlling circuit 270 further rotates the motor 130 in the counterclockwise direction. Consequently, the rotary plate 160 rotates until the contact portion 161 thereof abuts the support plate 220, as shown in FIG. 14, and the planetary gear 180 engages with the reel shaft gear 31. Consequently, in the state of FIG. 14, the portion 174B having the smaller diameter of the cam 174 of the internal gear 170 shortens the distance of movement of the head base 60 to the right side, compared with the playing mode. Namely, the portion 174B having smaller diameter of the cam 174 prevents nipping of the tape by the pinch roller 70 and the capstan shaft 40 and makes the erasing magnetic head 90 be in light contact with the tape.

Therefore, when the erasing magnetic head 90 is operated in this state, the apparatus enters the high speed erasing mode. In this case also, when the planetary gear 180 engages with the reel shaft gear 31, the controlling circuit 270 increases the speed of rotation of the motor 130. The internal gear 170 is kept stopped in the state of FIG. 14 from the same reason as described with reference to the playing mode.

The switching from the high speed erasing mode to the stopping mode will be described in the following.

When a stopping instruction signal is applied from the instructing circuit 260 to the controlling circuit 270 in the state of FIG. 14, the controlling circuit 270 rotates the motor 130 in the clockwise direction. Consequently, the rotary plate 160 rotates in the clockwise direction until the engaging projection 163 abuts the taper portion 241 of the stopper plate 240, as shown in FIG. 12. Thereafter, when the state of FIG. 6 is realized as in the case of switching from the playing mode to the stopping mode described above, the controlling circuit 270 stops the rotation of the motor 130 and the apparatus enters the stopping mode.

The switching from the playing mode to the fast forwarding mode will be described in the following. When a first forwarding instruction signal is applied from the instructing circuit 260 to the controlling circuit 270 in the state of FIG. 1, the controlling circuit 270 rotates the motor 130 in the counterclockwise direction. Consequently, the rotary plate 160 is rotated in the counterclockwise direction until the engaging projection 163 abuts the taper portion 242 of the stopper plate 240, as shown in FIG. 8. Thereafter, the apparatus is changed to that of FIG. 9 as in the switching from the stopping mode to the fast forwarding mode described above. When this state is realized, the control circuit 270 rotates the motor 130 in the clockwise direction to change the state of the apparatus to that of FIG. 10. Therefore, the apparatus enters the fast forwarding mode.

The switching from the fast forwarding mode to the playing mode will be described. When a playing instruction signal is applied from the instructing circuit 260 to the controlling circuit 270 in the state of FIG. 10, the controlling circuit 270 controls the motor 130 and the state of the apparatus is changed from the state of FIG. 9 to the state of FIG. 6 through the states shown in FIGS. 11 and 12, as in the case of switching from the fast forwarding mode to the stopping mode described above. Thereafter, the controlling circuit 270 changes the state of the apparatus to that shown in FIG. 1 through the states shown in FIGS. 7 and 8 as in the case of switching from the stopping mode to the playing mode.

The switching from the playing mode to the rewinding mode will be described. When a rewinding instruction signal is applied from the instructing circuit 260 to the controlling circuit 270 in the state of FIG. 1, the controlling circuit 270 controls the motor 130 so that the state of the apparatus is changed to the state of FIG. 6 through the states shown in FIGS. 8, 9, 11 and 12 as in the case of the switching from the playing mode to the stopping mode described above. Thereafter, the controlling circuit 270 changes the state of the apparatus to that of FIG. 13 as in the switching from the stopping mode to the rewinding mode, and the rewinding mode is realized.

The switching from the rewinding mode to the playing mode will be described. When a playing instruction signal is applied from the instructing circuit 260 to the controlling circuit 270 in the state of FIG. 13, the controlling circuit 270 controls the motor 130 and the state of the apparatus is changed to the state of FIG. 6 as in the case of switching from the rewinding mode to the stopping mode described above. Thereafter, the controlling circuit 270 changes the state of the apparatus to that of FIG. 1 through the states shown in FIGS. 7 and 8 as in the case of switching from the stopping mode to the playing mode described above, and the playing mode is realized.

The switching from the fast forwarding mode to the rewinding mode will be described. When a rewinding instruction signal is applied from the instructing circuit 260 to the controlling circuit 270 in the state of FIG. 10, the controlling circuit 270 changes the state of the apparatus to that of FIG. 6 through the states shown in FIGS. 9, 11 and 12, as in the case of switching from the fast forwarding mode to the stopping mode described above. Thereafter, a controlling circuit 270 changes the state of the apparatus to that of FIG. 13 as in the case of switching from the stopping mode to the rewinding mode described above, and the rewinding mode is realized.

Finally, the switching from the rewinding mode to the fast forwarding mode will be described in the following. When a fast forwarding instruction signal is applied from the instructing circuit 260 to the controlling circuit 270 in the state of FIG. 13, the control circuit 270 changes the state of the apparatus to that of FIG. 6 as in the case of switching from the rewinding mode to the stopping mode described above. Thereafter, the controlling circuit 270 changes the state of the apparatus to that of FIG. 10 through the states shown in FIGS. 7, 8 and 9 as in the case of switching from the stopping mode to the fast forwarding mode described above, and the fast forwarding mode is realized.

A second embodiment of the present invention will be described in the following. Compared with the first embodiment, the second embodiment comprises a modification 1 of the structure of the pinch roller 70 and a modification 2 of the structure of the stopper plate 240.

The background of the modification 1 will be described at first. In a general cassette tape, pads are provided at a position corresponding to the rear surface of the tape facing the erasing head and the recording/playing head of the magnetic tape recording and playback apparatus. The pad serves to softly press the tape onto the surface of the recording/playing head or the surface of the erasing head. This stabilizes the recording/playing/erasing operation on the tape. However, in some types of microcassettes, the pad is not formed at a position corresponding to the erasing head. When a microcassette of such type is used in the first embodiment, the erasing operation in the high speed erasing mode may possibly be unstable. More specifically, the playing magnetic head 80 and the erasing magnetic head 90 are stopped at positions slightly retracted from the surface of the tape as compared with the playing mode. Therefore, the contact between the tape surface and the erasing magnetic head 90 is weak, as there is no pad behind the rear surface of the tape. Therefore, the erasing operation becomes unstable.

The structure of the modification 1 will be described in the following. In the second embodiment, a pinch arm 71 of the pinch roller 70 is actually supported by the head base 60. The axis rotatably supporting the pinch roller 70 extends to the upper surface of the internal gear 170 through holes 63 and 13 respectively provided on the head base 60 and the main plate 10. The axis 72 of the pinch roller 70 is biased to the direction of the capstan shaft 40 by means of a spring 73. The pinch arm 71 is biased to the clockwise direction. The axis 72 of the pinch roller 70 moves along the through hole 13 of the main plate 10 corresponding to the movement of the head base 60 in the left and right directions.

Figure 19:
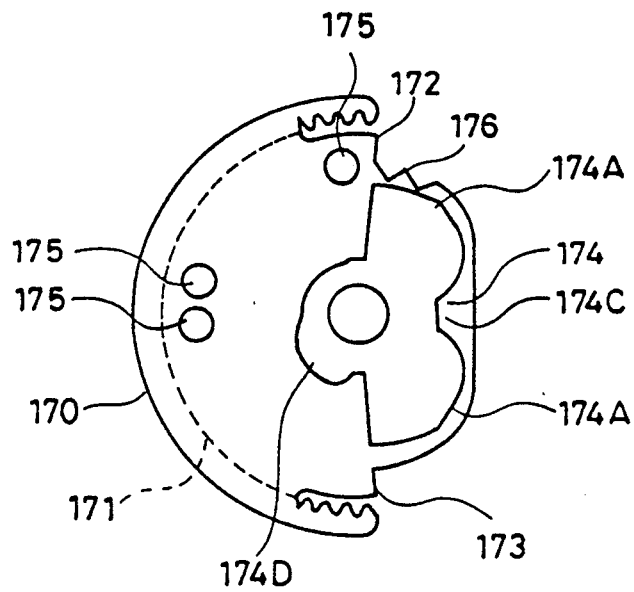
FIG. 19 is a plan view of an internal gear shown in FIG. 16.

The cam 174 of the internal gear 170 comprises portions 174A, 174A having large diameter arranged in symmetry, a concave portion 174C and a pinch roller cam 174D, as shown in FIG. 19. A portion of the portions 174A, 174A having large diameter or a portion of concave portion 174C of the internal gear 170 is exposed through the through hole 12 of the main plate 10 and the internal gear 170 is attached such that it abut the guiding portion 62 of the head base 60. Accordingly, the cam moves the head base 60 in the left and right directions as viewed in FIG. 16 against the force of the spring 100 in accordance with the rotation of the internal gear 170. When the internal gear 170 is at a position for the playing mode (naturally, the head base 60 is moved in the right direction in FIG. 16), the pinch roller cam 174D does not move the axis 72 of the pinch roller 70, thereby allowing pressure contact of the pinch roller 70 with the capstan shaft 40 by means of the spring 73 (see FIG. 22). When the internal gear 170 is at a position for high speed erasing mode, the pinch roller cam 174D moves the axis 72 of the pinch roller 70 in the left direction of FIG. 16 through respective through holes 13 and 16, so that the pinch roller 70 is spaced apart from the capstan shaft 40 (see FIG. 28). Therefore, the second embodiment is adapted such that the head base 60 is moved to the position for the playing mode and only the pinch roller 70 is moved by the pinch roller cam 174D, so as to keep stable contact of the erasing magnetic head 90 and the tape (by the provision of two portions 174A and 174A having large diameter of the cam 174). If one magnetic head which can be used for both playing and erasing is used, the erasing magnetic head can be in stable contact with the tape by the virtue of the pad of the cassette in the high speed erasing operation. However, such types of heads are expensive compared with a separate magnetic head and are inferior in quality.

The internal gear 170 comprises holes 175, 175, 175 for resetting and a step 176 for resetting provided at appropriate portions. The apparatus is adapted such that the controlling circuit 270 is reset when the head base 60 is in the state of FIG. 16. Therefore, if the apparatus happens to be an inoperable state in the state of FIG. 22 or FIG. 28, the apparatus does not properly operate even if the power is again turned on.

Figure 16:
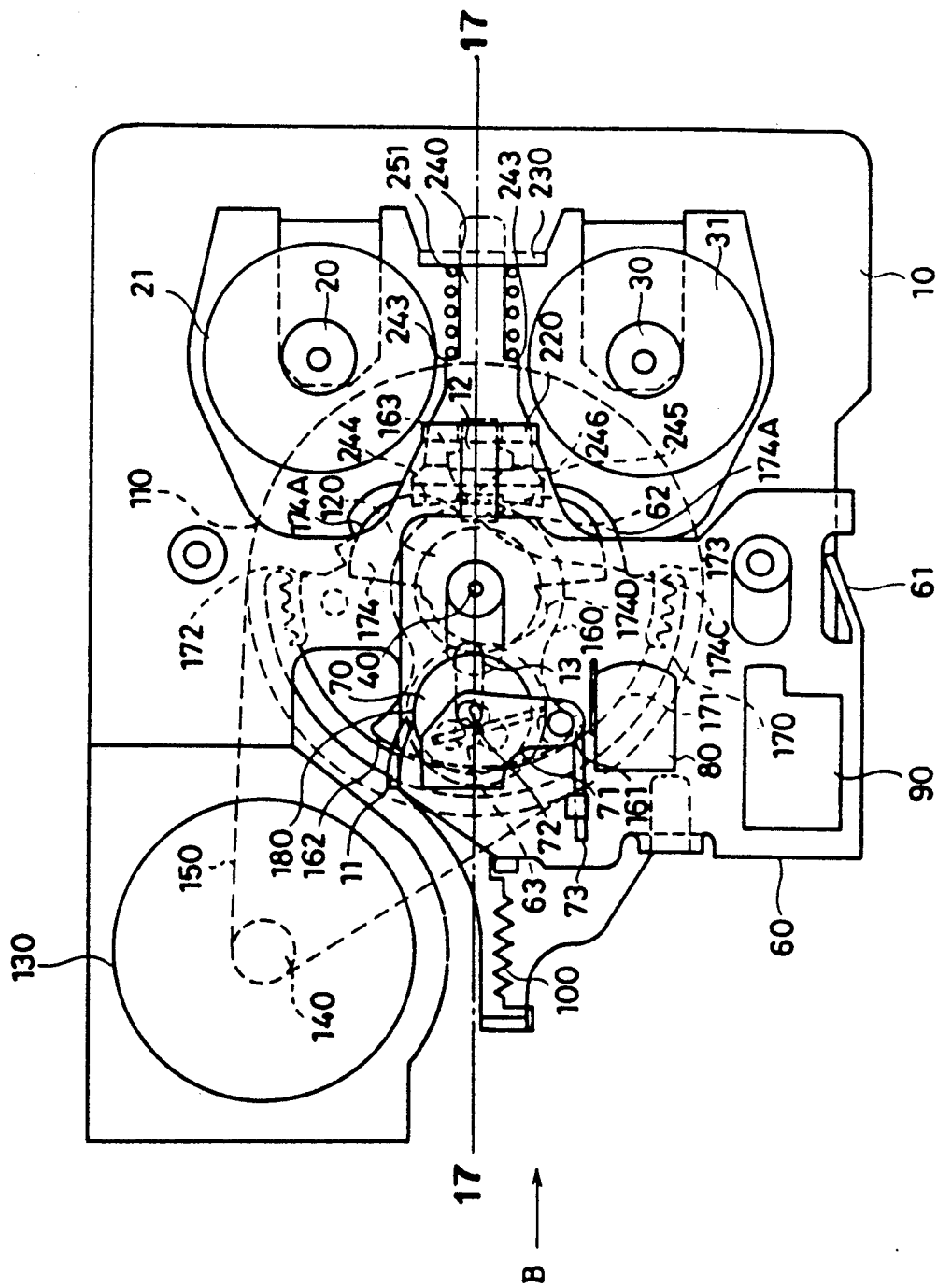
FIG. 16 is a plan view of a magnetic tape recording and playback apparatus in accordance with a second embodiment of the present invention.
Figure 17:
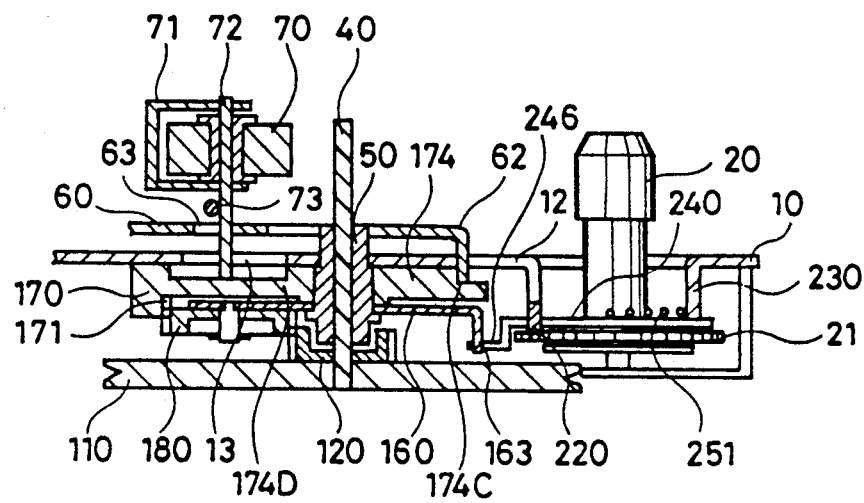
FIG. 17 is a cross sectional view taken along the line A—A' of FIG. 16.
Figure 18:
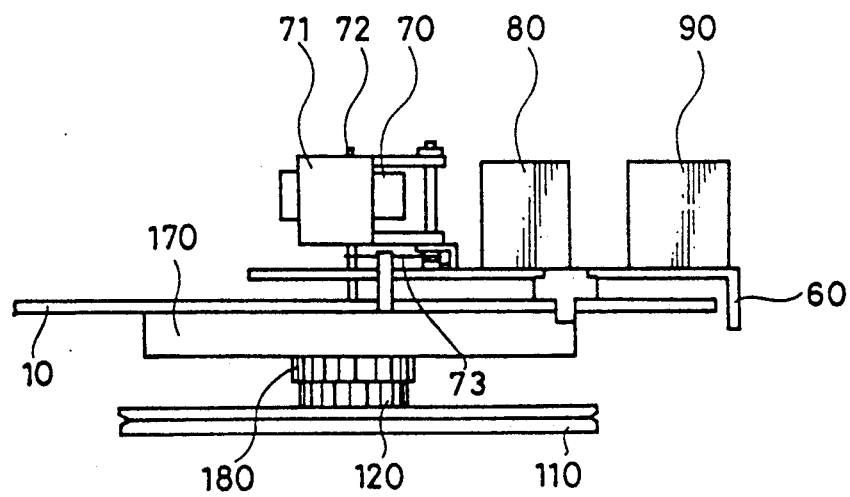
FIG. 18 is a side view taken from the direction of an arrow B in FIG. 16.
Figure 22:
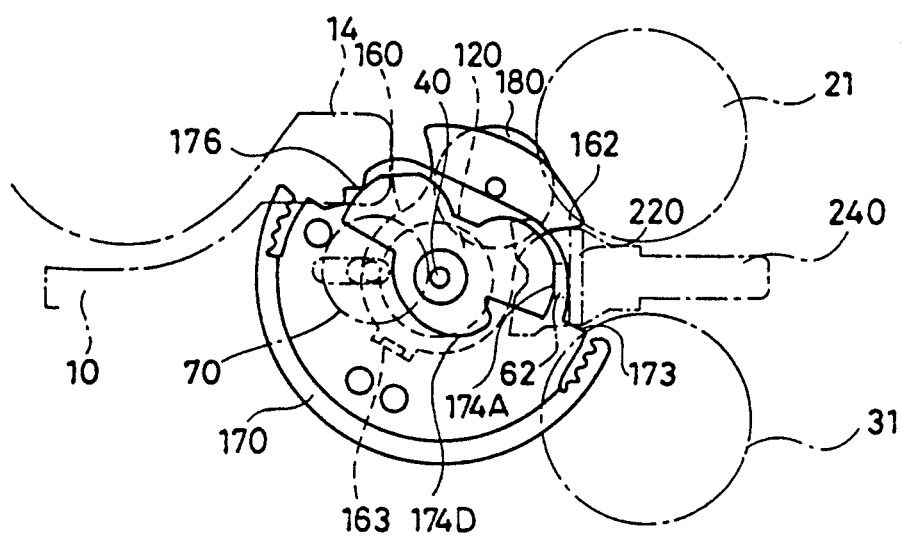
Figure 28:
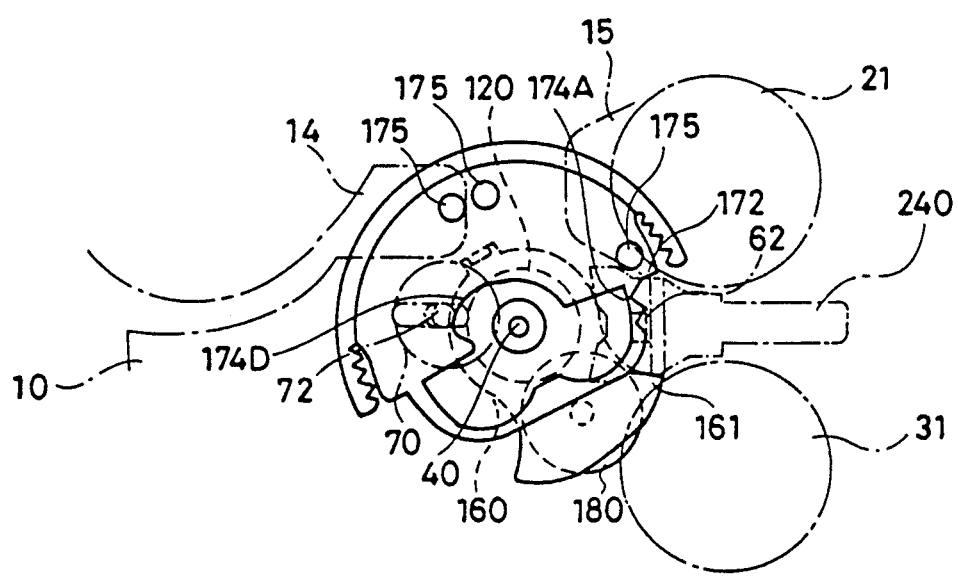
Figure 29:
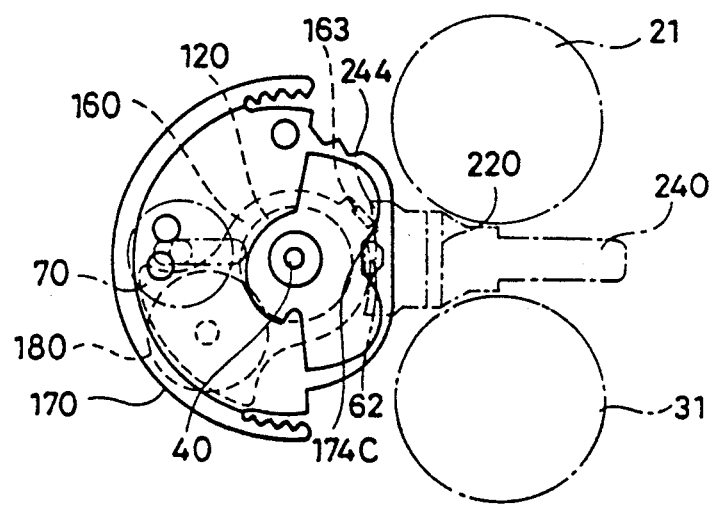

Therefore, the apparatus is adapted such that the internal gear 170 can be set to the state of FIG. 16 when a user operates the holes 175, 175, 175 for resetting or the step 176 for resetting through the opening 14 or 15 of the main plate 10 in the state of FIG. 22 or 28.

The structure of the modification 2 will be described in the following. Referring to FIG. 16, the right edge of the stopper plate 240 is inserted into a support plate 230 on the right side, and a support plate 220 of the left side is inserted in the left side portion of the stopper plate, and the stopper plate 240 is movable in the left and right directions between the respective support plates 220 and 230. The stopper plate 240 comprises a coil spring 251 inserted between the step portion 243 and the support plate 230. Therefore, the stopper plate 240 is biased to the left side. In addition, the stopper plate 240 comprises moderate tapers 244 and 245 on the left side and a concave portion 246 with a steep taper. In the second embodiment, the stopping mode corresponds to a state in which the engaging projection 163 of the rotary plate 160 is engaged with the concave portion 146 of the stopper plate 246, and the rotary plate 160 is not moved even if the apparatus itself is operated (see FIG. 16).

Figure 20:
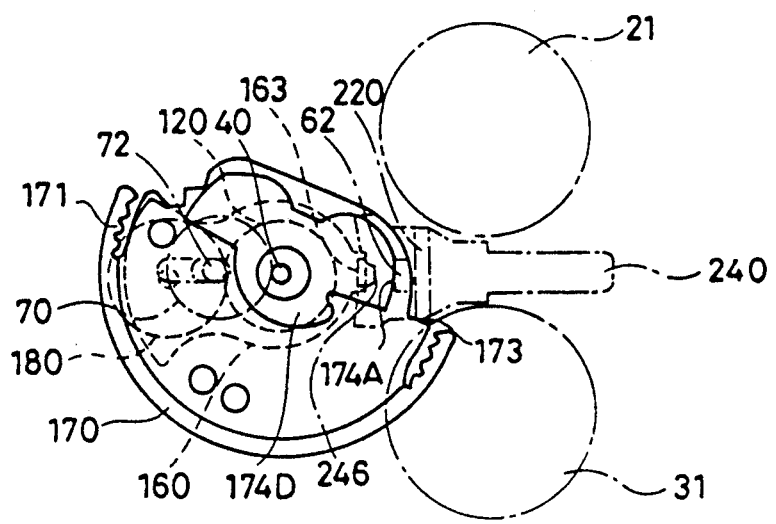
FIGS. 20 to 31 illustrate operations of the magnetic tape recording and playback apparatus corresponding to respective operation modes.

The operation of the second embodiment will be described in the following with reference to FIG. 16 and FIGS. 20 to 31. FIG. 32 illustrates relations between FIGS. 16, 20 to 31 corresponding to the switching between respective modes, and the operation will be described with reference to the illustration (in FIG. 32, the terms "clockwise" and "counterclockwise" represent directions of rotation of the motor 130 in FIG. 16). The motor operates in accordance with the block diagram of FIG. 5. First, description will be given of the switching from the stopping mode to the playing mode. When a playing instruction signal is applied from the instructing circuit 260 to the controlling circuit 270, the controlling circuit rotates the motor 130 in the clockwise direction as viewed in FIG. 16. Consequently, the flywheel 110 and the driving gear 120 are also rotated in the clockwise direction. Although the rotary plate 160 tends to rotate in the clockwise direction by the rotation of the driving gear 120 in the clockwise direction, it is kept stopped as the engaging projection 163 is engaged with the concave portion 246 of the stopper plate 240 (by the force of the coil spring 251, as described with reference to the first embodiment). In this state, the rotation of the driving gear 120 is transmitted to the internal teeth portion 171 of the internal gear 170 through the planetary gear 180 and the internal gear 170 rotates in the counter clockwise direction. When the internal gear 170 is rotated and the step 173 abuts the support plate 220 as shown in FIG. 20, the guiding portion 62 of the head base 60 is moved to the right by the portion 174A having large diameter of the cam 174. Therefore, the pinch roller 70 and the capstan shaft 40 sandwiches the tape, and the playing magnetic head (80) is brought into contact with the tape. Meanwhile, it is assumed that the force of the guiding portion 62 to the cam 174 rotates the internal gear 170 in the counterclockwise direction as the cam 174 is so shaped, and the internal gear 170 is stopped in the above described state.

Figure 21:
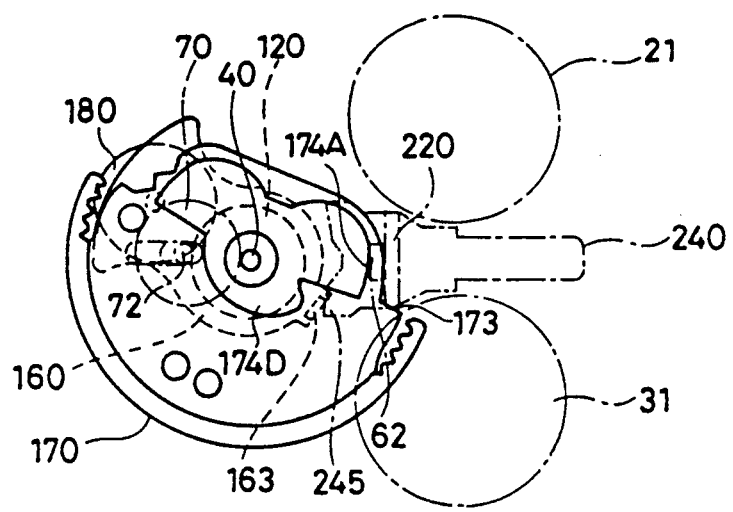

When the above described state is realized, the internal gear 170 does not further rotate in the counterclockwise direction, so that the rotary plate 160 moves the stopper plate 240 in the right against the force of the spring 251, by means of the engaging projection 163, and rotates in the clockwise direction as shown in FIG. 21. The rotary plate 160 continues to rotate until the contact portion 162 abuts the support plate 220, whereby the planetary gear 180 is engaged with one reel shaft gear 21, as shown in FIG. 22. Thus, the apparatus entered the playing mode is realized.

The switching from the playing mode to the switching mode will be described in the following. When a stopping instruction signal is applied from the instructing circuit 260 to the controlling circuit 270 in the state of FIG. 22, the controlling circuit 270 rotates the motor 130 in the counterclockwise direction.

Figure 23:
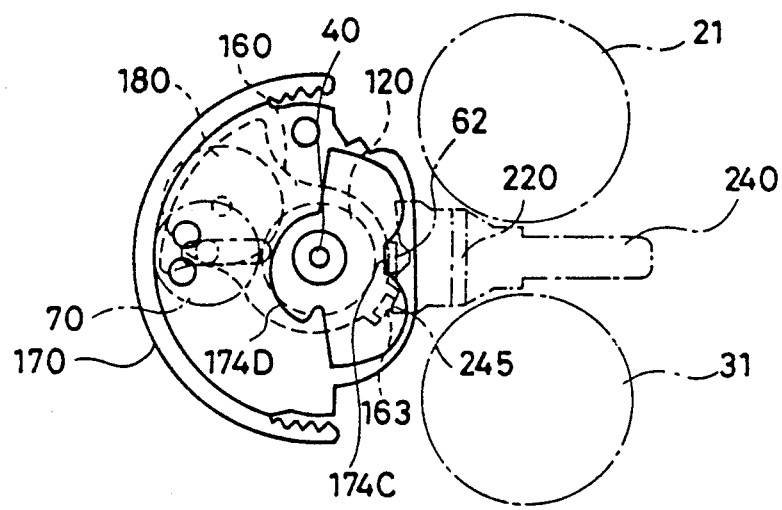
Figure 24:
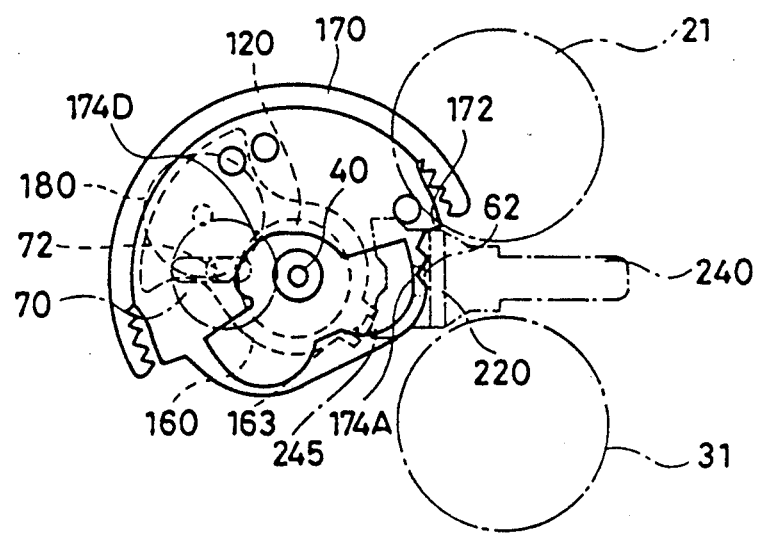
Figure 25:
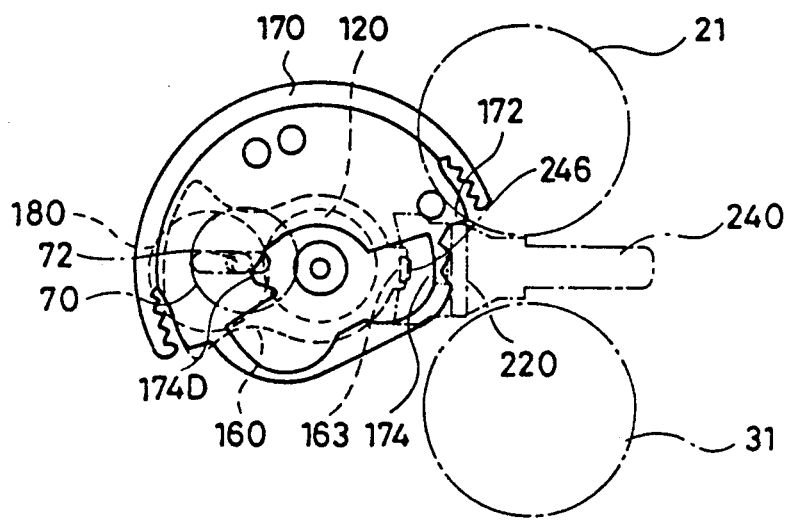

Consequently, the rotary plate 160 rotates in the counterclockwise direction until the engaging projection 163 abuts the taper portion 245 of the stopper plate 24, as shown in FIG. 21. In this state, the planetary gear 180 has been engaged with the internal teeth portion 171 of the internal gear 170, so that the rotation of the driving gear 120 is transmitted to the internal teeth portion 171 of the internal gear 170 through the planetary gear 180. Therefore, the internal gear 170 rotates in the clockwise direction. By the rotation of the internal gear 170, the position of contact of the guiding portion 62 with the cam 174 is changed. Consequently, the force of the guiding portion 62 to the cam 174 (caused by the spring 100) serves to rotate the internal gear 174 in the clockwise direction, as the cam 174 is so shaped, and the state of the internal gear 170 will be as shown in FIG. 23. When the driving gear 170 further rotates in the counter clockwise direction, the step 172 of the internal gear 170 abuts the support plate 220 as shown in FIG. 24. When the driving gear 120 continues to rotate in the counterclockwise direction, the rotary plate 160 moves the stopper plate 240 by the engaging projection 163 in the right against the force of the spring 251, and the engaging projection 163 is engaged with the concave portion 246 of the stopper plate 240, as shown in FIG. 25. When this state is realized, the controlling circuit 270 rotates the motor 130 in the clockwise direction. Then, the internal gear 170 rotates in the counterclockwise direction. By the rotation of the internal gear 170, the position of contact of the guiding portion 62 and the cam 174 is changed, and the internal gear 170 is brought to the state of FIG. 16 by the force of the guiding portion 62, as in the above described the case. When this state is realized, the controlling circuit 270 stops the rotation of the motor 130 and the apparatus is in the stopping mode.

The switching from the stopping mode to the fast forwarding mode will be described in the following. When a fast forwarding instruction signal is applied from the instructing circuit 260 to the controlling circuit 270 in the state of FIG. 16, the controlling circuit 270 rotates the motor 130 in the clockwise direction, and the state of the apparatus is changed from that of FIG. 20 to that of FIG. 21 as in the switching from the stopping mode to the playing mode. When the state of FIG. 21 is realized, the controlling circuit 270 rotates the motor 130 in the counterclockwise direction.

Figure 26:
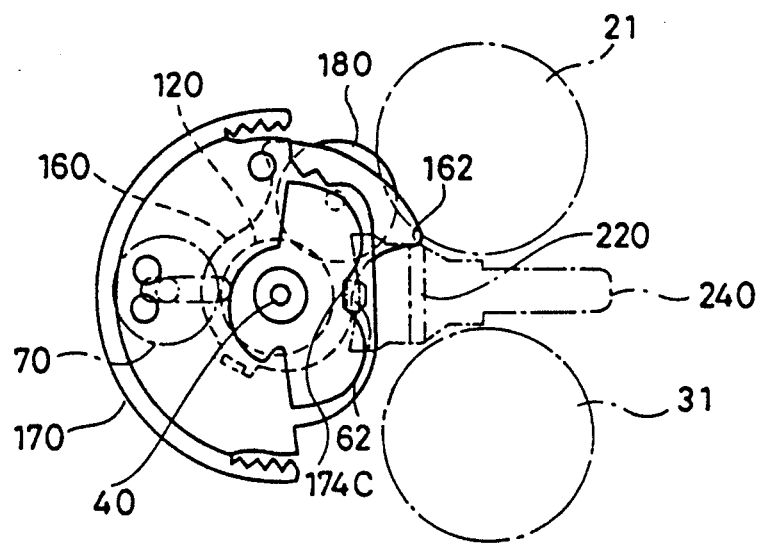

Therefore, as in the switching from the the playing mode to the stopping mode, the state of the apparatus is changed to that of FIG. 23. In this state, the pinch roller 70 is completely separated from the capstan shaft 40 and the respective magnetic heads 80 and 90 are completely separated from the tape, as in the case of FIG. 16. When this state is realized, the controlling circuit 270 again rotates the motor 130 in the clockwise direction. Consequently, the rotary plate 160 rotates until the contact portion 162 abuts the support plate 220, as shown in FIG. 26. When the planetary gear 180 engages with the reel shaft gear 21, the fast forwarding mode is realized.

The switching from the fast forwarding mode to the stopping mode will be described in the following. When a stopping instruction signal is applied from the instruction circuit 260 to the controlling circuit 270, the controlling circuit 270 rotates the motor 130 in the counterclockwise direction. In this state, the internal gear 170 is stopped by the force of the guiding portion 62, the rotary plate 160 is rotated in the counterclockwise direction, and the apparatus is brought into the state of FIG. 23. Thereafter, the operation is the same as that of switching from the playing mode to the stopping mode.

The switching from the stopping mode to the high speed erasing mode will be described in the following. When a playing instruction signal is applied from the instructing circuit 260 to the controlling circuit 270 in the state of FIG. 16, the controlling circuit 270 rotates the motor 130 in the counterclockwise direction. In this state, the rotary plate 160 is stopped, so that the internal gear 170 is rotated in the clockwise direction, and the apparatus is brought into the state of FIG. 25. In this state, the guiding portion 62 of the head base 62 is moved in the right by the portion 174A having large diameter of the cam 174 of the internal gear 170. Due to the shape of the cam 174, the internal gear 170 is stopped in this state. Therefore, the erasing magnetic head 90 is in contact with the tape as in the playing mode. However, the tape is not sandwiched by the capstan shaft 40 and the pinch roller 70, since the pinch roller 70 is moved in the left by the pinch roller cam 174D. When the driving gear 120 is further rotated in the counterclockwise direction in this state, the state of the apparatus is changed to that of FIG. 27 and further to the state of FIG. 28 from the same reason as in the switching from the stopping mode to the playing mode, and the high speed erasing mode is realized.

The switching from the high speed erasing mode to the playing mode will be described in the following. When a stopping instruction signal is applied from the instruction circuit 260 to the control circuit 270 in the state of FIG. 28, the controlling circuit 270 rotates the motor 130 in the clockwise direction. Therefore, the rotary plate 160 is in the state of FIG. 27.

Figure 30:
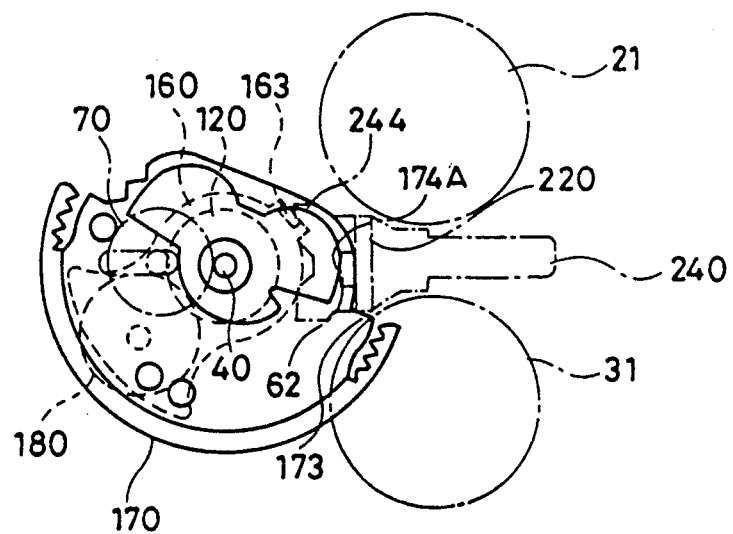

If this state is realized, the rotation of the driving gear 120 is transmitted to the inner teeth portion 171 of the internal gear 170 through the planetary gear 180. Therefore, the inner gear 170 rotates in the counterclockwise direction, and the position of contact between the guiding portion 62 and the cam 174 is changed. In this case also, the state of the internal gear 174 is changed to that of FIG. 29 from the same reason as the switching from the playing mode to the stopping mode. When the driving gear 120 is further rotated in the clockwise direction, the step 173 of the internal gear 170 abuts the support plate 220 as shown in FIG. 30, and thereafter the engaging project 163 of the rotary plate 160 engages with the concave portion 246 of the stopper plate 240, as shown in FIG. 20. If this state is realized, the control circuit 270 rotates the motor 130 in the counterclockwise direction. Consequently, the internal gear 170 rotates in the clockwise direction. By the rotation of the internal gear 170, the position of contact between the guiding portion 62 and the cam 174 is changed, and the state of the internal gear 170 will be as shown in FIG. 16, as in the above described case. Thus the apparatus enters the stopping mode.

Figure 27:
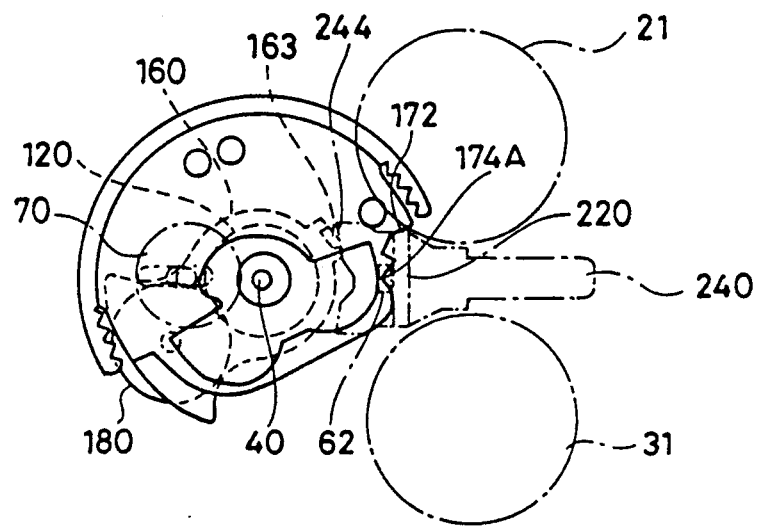
Figure 31:
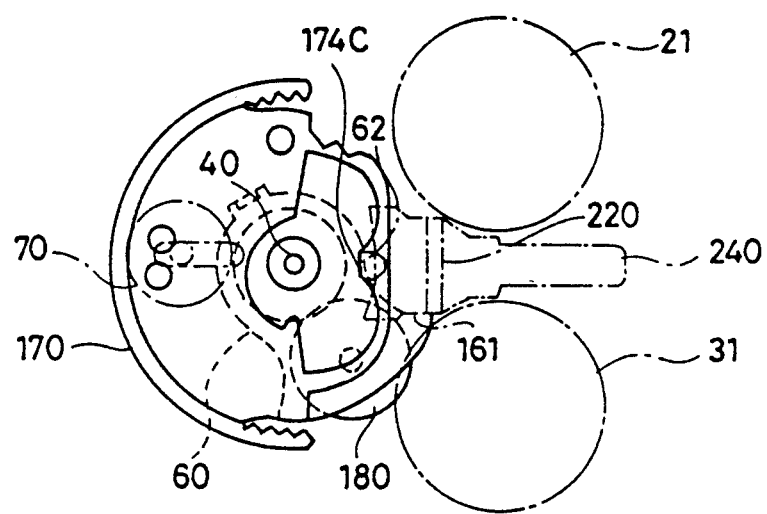

The switching from the stopping mode to the rewinding mode will be described in the following. When a rewinding instruction signal is applied from the instruction circuit 260 to the controlling circuit 270 in the state of FIG. 16, the control circuit 270 rotates the motor 130 in the counterclockwise direction, and changes the state of the apparatus from that of FIG. 25 to that of FIG. 27 as in the case of switching from the stopping mode to the high speed erasing mode. When the state of FIG. 27 is realized, the control circuit 270 rotates the motor 130 in the clockwise direction as in the case of switching from the high speed erasing mode to the stopping mode. Therefore, the state of the apparatus is changed to that of FIG. 29. When this state is realized, the controlling circuit 270 again rotates the motor 130 in the counterclockwise direction. Therefore, the rotary plate 160 is rotated until the contact portion 161 abuts the support plate 220, as shown in FIG. 31. When the planetary gear 180 engages with the reel shaft gear 31, the apparatus enters the rewinding mode.

The switching from the rewinding mode to the stopping mode will be described in the following. When a stopping instruction signal is applied from the instructing circuit 260 to the controlling circuit 270 in the state of FIG. 31, the controlling circuit 270 rotates the motor 130 in the clockwise direction. In this state, the internal gear 170 is stopped by the force of the guiding portion 62, and the rotary plate 160 is rotated in the clockwise direction to the state of FIG. 29. The following operation is the same as that in the switching from the high speed erasing mode to the stopping mode.

The switching from the playing mode to fast forwarding mode, fast forwarding mode to playing mode, playing mode to rewinding mode, rewinding mode to playing mode, fast forwarding mode to rewinding mode, and rewinding to the fast forwarding mode are basically carried out in accordance with the illustration of FIG. 32, so that description thereof will be omitted.

In the first and second embodiments, the control circuit 270 controls the motor 130 at a prescribed timing in switching between respective modes. A sensor for detecting positions of the rotary plate 160 and internal gear 170 may be provided, and the control circuit 270 may control the motor based on these positions.

As described above, in the magnetic tape recording and playback apparatus of the present invention, the head base can be placed at prescribed positions and one of the respective reel shafts can be rotated by controlling the direction of rotation of the motor by controlling means and by moving the planetary gear in a prescribed direction. Therefore, there is no need to employ a magnetic solenoid in switching the modes of running, whereby the apparatus can be made compact. Accordingly, a large power is not necessary. In addition, the driving gear and the planetary gear are contained in the internal gear, making the apparatus smaller.

In fast erasing, the pinch roller can be separated from the capstan shaft with the head base kept at the position of the playing mode, so that the contact between the tape and the head can be maintained stable in any types of cassette tapes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic tape recording and playback apparatus for selectively operating in a recording/playing mode, rewinding mode and fast forwarding mode of a magnetic tape contained in a cassette attached to the apparatus, comprising:

a pair of reel spindles engaging with reels of the cassette;

a magnetic head provided movable between a projected position enabling recording/playing of a tape and a retracted position;

a head base supporting said magnetic head;

driving source for generating a rotating power to said pair of reel spindles and a rotating power for moving of said head base; said driving source comprising a motor which can be operated in forward and reverse directions;

transmitting means for transmitting said rotating power of said driving source to one of said pair of reel spindles in the recording/playing mode and in the fast forwarding mode, and for transmitting said power to the other one of said pair of reel spindles in the rewinding mode; said transmitting means comprising a gear train for transmitting power generated by said driving source to said pair of reel spindles; said gear train comprising a rotary shaft operated in association with said motor, a driving gear provided on said rotary shaft, a pair of reel shaft gears provided on said pair of reel spindles, a planetary gear engaging with said driving gear of said rotary shaft, moving between a position engaging with one of said pair of reel shaft gears and a position engaging with the other one of said reel shaft gears, and a rotary plate mounted rotatably and coaxially with said rotary shaft and supporting said planetary gear; and linking means coupled mechanically between said had base and said transmitting means for moving said magnetic head to the projected position in the recording/playing mode, and for moving said magnetic head to the retracted position in the rewinding mode and in the fast forwarding mode, said linking means comprising a cam body and a cam follower, said cam body operating by utilizing rotating power transmitted from said motor to said gear train through said rotary shaft, and said cam follower being connected to said head base following the operation of said cam body, so as to move said head support member.

2. A magnetic tape recording and playback apparatus according to claim 1, wherein said cam body comprises a gear portion and a cam portion, said gear portion engaging with said planetary gear of said gear train and said cam potion is in contact with said cam follower, and said cam portion is shaped such that said magnetic head support by said head base is moved between said projected position and said retracted position in accordance with the rotating operation of said cam body.

3. A magnetic tape recording and playback apparatus according to claim 2, wherein said cam body is provided coaxially with said rotary shaft, and said gear portion comprises inner teeth engaging with said planetary gear.

4. A magnetic tape recording and playback apparatus comprising:

a magnetic head;

a head base on which said magnetic head is mounted;

a flywheel having a rotational axis;

a motor for rotating said flywheel in forward and reverse directions;

controlling means for controlling said motor;

a pair of reel spindles;

reel spindle gears for rotating respective reel shafts;

a driving gear provided coaxially with said flywheel;

a rotary plate connected for rotation with said flywheel about said rotational axis of said flywheel;

a planetary gear axially supported by said rotary plate engaging with said driving gear, movable into engagement with respective ones of said reel spindle gears by rotation of said rotary plate corresponding to rotation of said driving gear; and an internal gear connected for rotation with said flywheel about said rotational axis of said flywheel, said internal gear having an inner teeth portion engaging with said planetary gear during movement and a cam portion capable of changing a position of said head base corresponding to a position of rotation set by an engagement with said planetary gear, and a cam follower; said cam portion being operable by rotational power supplied by said motor via said driving gear and said planetary gear, and said cam follower being connected to said head base so as to follow operation of said cam portion to move said head base.

5. A magnetic recording and playback apparatus according to claim 4, wherein
said planetary gear is in pressure contact with said rotary plate.

6. A magnetic tape recording and playback apparatus, comprising:
a magnetic head;
a head base on which said magnetic head is mounted;
a flywheel;
a motor for rotating said flywheel in forward and reverse directions;
controlling means for controlling said motor;
a pair of reel spindles;
reel spindle gears for rotating respective reel shafts;
a driving gear provided coaxially with said flywheel;
a rotary plate provided rotatably and coaxially with said flywheel;
a planetary gear axially supported by said rotary plate engaging with said driving gear, moved to be engaged with said respective reel spindle gears by the rotation of the rotary plate corresponding to the rotation of the driving gear; and
an internal gear provided rotatably and coaxially with said flywheel, having an inner teeth portion engaging with said planetary gear during movement of said planetary gear from one of the reel spindle gears to the other one of the reel spindle gear, and a cam means for changing a position of said head base corresponding to a position of rotation set by an engagement with said planetary gear; said cam means of said internal gear comprising a first portion for moving forward said head base to a position enabling recording/playing in said recording/playing mode, and a second portion for retracting said head base in said rewinding mode and in said fast forwarding mode.

7. A magnetic tape recording and playback apparatus according to claim 6, further comprising:
a capstan shaft (40) provided on said flywheel;
a pinch roller (70) rotating in contact with said capstan shaft;
a pinch arm (71) rotatably attached to said head base for rotatably holding said pinch roller; and
biasing means (73) for biasing said pinch roller in a direction to be in contact with said capstan shaft.

8. A magnetic tape recording and playback apparatus according to claim 7, wherein
said magnetic tape recording and playback apparatus further operates in a high speed erasing mode, and
said cam (174) of the internal gear comprises said first portion for moving forward said head base and a third portion (174D) for moving said pinch roller away from said capstan shaft, in said high speed erasing mode.

9. A magnetic tape recording and playback apparatus according to claim 8, further comprising:
a first stopper (240) engaging with said rotary plate for temporarily stopping planetary movement of said planetary gear and for rotating said planetary gear to move said internal gear engaging with said planetary gear to a prescribed position of rotation; and
a second stopper (22) engaging with said internal gear for temporarily stopping rotation of said internal gear and for moving said planetary gear to engage said planetary gear with one of said reel shaft gears.

10. A magnetic tape recording and playback apparatus for receiving a cassette containing a magnetic tape, for selectively operating in a recording/playing mode for recording/playing said magnetic tape, a rewinding mode for rewinding said magnetic tape, and a fast forwarding mode for fast forwarding of said magnetic tape, comprising:
a pair of reel spindles engaging the reels of the cassette;
a magnetic head which is movable between a projected position enabling recording/playing of a tape and a retracted position;
a head base supporting said magnetic head;
a driving means for supplying power to cause rotation of said pair of reel spindles and for supplying power for moving said magnetic head and said head base;
transmitting means selectively actuatable to operate in one of a recording/playing mode, a rewinding mode, and a fast forwarding mode, for transmitting power from said driving means to one of said pair of reel spindles when in said recording/playing mode and when in said fast forwarding mode, and for transmitting power to the other one of said pair of reel spindles when in said rewinding mode; said transmitting means comprising a planetary gear axially supported by a rotary plate engaging with said driving means, moved to be engaged with said pair of respective reel spindles by the rotation of said rotary plate corresponding to the rotation of said driving means;
linking means selectively operable in one of said recording/playing mode, said rewinding mode, and said fast forwarding mode, and being coupled between said head base and said transmitting means for moving said magnetic head to said projected position when in said recording/playing mode, and for moving said magnetic head to said retracted position when in said rewinding mode and in said fast forwarding mode; said linking means comprising an internal gear rotatably and coaxially with said planetary gear so as to engage the pair of reel spindles and the head base;
instructing means for selecting one of said recording/playback mode, said rewinding mode, and said fast forwarding mode; and
controlling means responsive to said instructing means for controlling operation of said driving means, said transmitting means, and said linking means in each of said recording/playback mode, said rewinding mode, and said fast forwarding mode.

11. A magnetic tape recording and playback apparatus for receiving a cassette containing a magnetic tape, for selectively operating in a recording/playing mode for recording/playing said magnetic tape, a rewinding mode for rewinding said magnetic tape, and a fast forwarding mode for fast forwarding of said magnetic tape, comprising:
a magnetic head;
a head base on which said magnetic head is mounted;
a flywheel having a rotational axis;
a motor for rotating said flywheel in forward and reverse directions;
a pair of reel spindles;
a reel spindle gears for rotating respective reel shafts;

a driving gear provided coaxially with said flywheel;

a rotary plate connected for rotation with said flywheel about said rotational axis of said flywheel;

a planetary gear axially supported by said rotary plate engaging with said driving gear, movable into engagement with respective ones of said reel spindle gears by rotation of said rotary plate corresponding to rotation of said driving gear; and an internal gear connected for rotation with said flywheel about said rotational axis of said flywheel, said internal gear having a cam portion and an inner teeth portion engaging with said planetary gear during movement of said planetary gear from one of said reel spindle gears to the other one of said reel spindle gears, said cam portion changing a position of said head base corresponding to a position of rotation set by an engagement with said planetary gear; said cam portion being operable by rotational power supplied by said motor via said driving gear and said planetary gear; and a cam follower connected to said head base, said cam follower following operation of said cam portion to move said head base;

instructing means for selecting one of said recording/playback mode, said rewinding mode, and said fast forwarding mode; and controlling means responsive to said instructing means, for controlling operation of said motor, said transmitting means, and said linking means in each of said recording/playback mode, said rewinding mode, and said fast forwarding mode.

* * * * *